US009747478B2

(12) United States Patent
Bucherer-Klingler et al.

(10) Patent No.: US 9,747,478 B2
(45) Date of Patent: Aug. 29, 2017

(54) LOW COST, WIDE AREA RFID SYSTEM

(71) Applicant: Astoria Solutions Pte Ltd., Singapore (SG)

(72) Inventors: Daniel A. Bucherer-Klingler, Singapore (SG); Shivakumar N. Chintadripet, Singapore (SG); Dominic Loke, Singapore (SG)

(73) Assignee: Astoria Solutions Pte Ltd., Singapore (SG)

( * ) Notice: Subject to any disclaimer, the term of this patent is extended or adjusted under 35 U.S.C. 154(b) by 14 days.

(21) Appl. No.: 14/671,621

(22) Filed: Mar. 27, 2015

(65) Prior Publication Data

US 2015/0347792 A1 Dec. 3, 2015

Related U.S. Application Data

(60) Provisional application No. 62/003,710, filed on May 28, 2014.

(51) Int. Cl.
*G06K 7/10* (2006.01)
(52) U.S. Cl.
CPC ..... *G06K 7/10356* (2013.01); *G06K 7/10297* (2013.01)
(58) Field of Classification Search
CPC ............. G06K 7/10356; G06K 7/10297
USPC ........................................ 340/10.1
See application file for complete search history.

(56) References Cited

U.S. PATENT DOCUMENTS

| 2002/0196126 | A1* | 12/2002 | Eisenberg | G06K 17/00 340/10.2 |
| 2006/0022800 | A1* | 2/2006 | Krishna | G06K 7/0008 340/10.2 |
| 2006/0047789 | A1* | 3/2006 | Kumar | G07C 9/00111 709/220 |
| 2006/0097873 | A1* | 5/2006 | Vrba | G05B 19/4183 340/572.1 |
| 2006/0250248 | A1* | 11/2006 | Tu | G06Q 10/06 340/572.4 |
| 2009/0146792 | A1* | 6/2009 | Sadr | G06K 7/10188 340/10.3 |

* cited by examiner

*Primary Examiner* — Edwin Holloway, III
(74) *Attorney, Agent, or Firm* — Wolf, Greenfield & Sacks, P.C.

(57) ABSTRACT

Techniques for radio-frequency identification systems include sensor systems having a sensor unit and one or more sensors and a server. The sensor system includes one or more antennas at a location configured to receive signals from a tag proximate to an antenna and a processor configured to process tag detection signals based on the received signals. The processing may include selectively storing tag detection signals received from one or more antennas and identify an event related to the presence of a tag proximate to an antenna at the location. Sensor system may include a transmitter configured to transmit a message indicating the event over a network to a server. The server may be configured to process the message by analyzing a feature of the signals related to the event. The analysis may evaluate an adjustment of a configuration parameter used to operate an antenna. The configuration parameter may be updated by the server, and the server may transmit a message indicating the configuration parameter to the sensor system.

21 Claims, 10 Drawing Sheets

LOW COST, WIDE AREA RFID SYSTEM

BACKGROUND

Radio-frequency identification (RFID) technology may be used to identify and/or track objects by attaching tags to the objects and placing sensors to detect the tags. A sensor with one or more antennas may read the identification information stored on a tag. For example, a sensor or reader may read the identification information on a tag by transmitting an electromagnetic signal, which powers the tag through electromagnetic induction, allowing the tag to transmit a signal containing the identification information. An antenna may receive the signal, and the sensor may report the detected tag to a user. RFID systems may be used in a variety of applications where it is desirable to track objects such as goods, people, and/or animals.

SUMMARY

According to an aspect of the present application, a system is provided. The system comprises a plurality of antennas deployed in a location. Each antenna of the plurality of antennas is configured to receive a signal indicative of a tag proximate to the antenna. The system further comprises a memory and a processor configured to process tag detection signals that are based on the received signals. The processing comprises selectively storing tag detection signals in the memory and identifying an event related to presence of a tag at the location based on a plurality of tag detection signals. The plurality of tag detection signals comprising at least one stored tag detection signal. The system further comprises a transmitter configured to transmit a message indicating the event over a wide area network to a server.

In some embodiments, identifying an event comprises identifying that a tag detection signal of the plurality of tag detection signals includes tag identification information that matches tag identification information of the at least one stored tag detection signal. In some embodiments, the tag detection signal of the plurality of tag detection signals is based on signals received by a first antenna of the plurality of antennas and the at least one stored tag detection signal is based on signals received by a second antenna of the plurality of antennas.

In some embodiments, the processor is further configured to store time information associated with the at least one stored tag detection signal, and identifying an event comprises comparing the time information associated with the at least one stored tag detection signal to time information associated with at least one other tag detection signal of the plurality of tag detection signals. In some embodiments, an event is identified by comparing a difference between the time information associated with the at least one other tag detection signal and the time information associated with the at least one stored tag detection signal to a time interval. In some embodiments, an event is identified when a difference between the time information associated with the tag detection signal of the plurality of tag detection signals and the time information associated with the at least one stored tag detection signal is greater than a time interval, and the tag detection signal of the plurality of tag detection signals includes tag identification information that is distinct from the tag identification information of the at least one stored tag detection signal. In some embodiments, an event is identified by an absence of at least one tag detection signal corresponding to the tag for an amount of time exceeding a time interval.

In some embodiments, the at least one stored tag detection signal is modified to reflect the identified event. In some embodiments, the at least one stored tag detection signal is deleted from the memory when a difference between time information associated with the at least one stored tag detection signal and a current time is greater than a predetermined time interval. In some embodiments, the transmitter is configured to transmit the message via at least one data buffer, and the at least one data buffer is configured to store at least a portion of the message when the transmitter is unable to transmit the message. In some embodiments, the transmitter is configured to transmit at least a portion of the message over the wide area network when the system is in communication with the server and the at least one data buffer is configured to store at least a portion of the message when transmission of the message is interrupted.

According to an aspect of the present application a system is provided. The system comprises a wide area network receiver configured to receive, from a sensor unit having a plurality of antennas, a message reporting at least one event identified by the sensor unit processing signals received from a tag proximate to an antenna of the plurality of antennas and at least one feature of the signals. The system further comprises a processor configured to process the message. The processing comprises analyzing the at least one event and the at least one feature to evaluate adjustment of a configuration parameter used to operate the sensor unit or at least one antenna of the plurality of antennas and updating the configuration parameter when analysis of the at least one event and the at least one feature indicates adjusting the configuration parameter. The system further comprises a wide area network transmitter configured to transmit the updated configuration parameter to the sensor unit.

In some embodiments, processing the message further comprises analyzing the at least one event to identify a portion of the at least one event that consolidates a number of occurrences for an event type. In some embodiments, processing the message further comprises analyzing the at least one event and the at least one feature to identify information indicative of a status of the sensor unit, and the processor is further configured to present a status message indicating the status to a user. In some embodiments, the updated configuration parameter is used to operate the at least one antenna in response to the sensor unit receiving the updated parameter. In some embodiments, processing the message further comprises presenting information related to the message to a user. The information presented to the user indicates a status of the sensor unit.

According to an aspect of the present application, at least one computer-readable medium storing computer-executable instructions that, when executed, perform a method is provided. The method comprises receiving, from a plurality of antennas deployed in a location, signals indicating a tag proximate to an antenna of the plurality of antennas. The method further comprises processing, by a reader unit in communication with the plurality of antennas, tag detection signals that are based on the received signals. The processing comprises selectively storing tag detection signals and identifying events related to presence of a tag at the location based on a plurality of tag detection signals, the plurality of tag detection signals comprising at least one stored tag detection, and wherein the events include a plurality of event types. The method further comprises transmitting a message indicating the events from the reader unit over a wide area network to a server.

In some embodiments, the received signals indicate at least one configuration parameter of the antenna, and identifying events is based on the at least one configuration parameter. In some embodiments, the plurality of event types includes an event type corresponding to arrival of the tag to a region proximate to an antenna of the plurality of antennas at the location. In some embodiments, the plurality of event types includes an event type corresponding to departure of the tag from a region proximate to an antenna of the plurality of antennas at the location. In some embodiments, the plurality of event types includes an event type corresponding to movement of a user associated with the tag from a first region proximate to a first antenna at the location to a second region proximate to a second antenna at the location.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
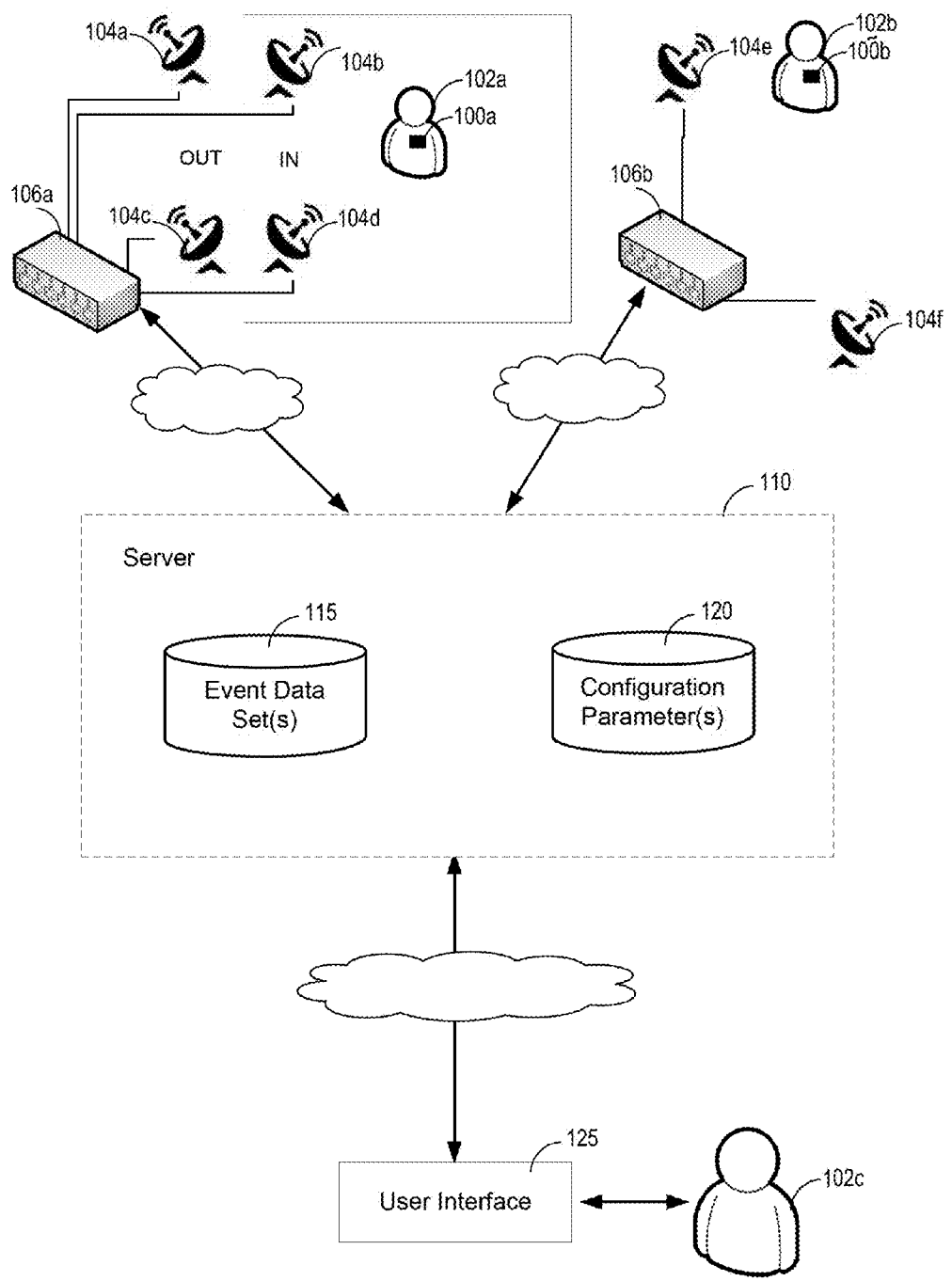
FIG. 1 is an exemplary RFID system for identifying events associated with objects having RFID tags.

The inventors have recognized and appreciated techniques that enable operation of a radio-frequency identification (RFID) system to economically generate large quantities of useful information. Such a system may be implemented with relatively inexpensive hardware. As a result, the RFID system may be deployed over a wide area and may be capable of tracking a large number of objects with RFID tags.

The data collected by the RFID system may be sent to one or more servers for analysis. In some embodiments, the one or more servers may be cloud-based servers, such that further efficiencies may be achieved by using readily available and low cost networking and computation services, without the need for any special hardware deployment. Sensors, for example, may be deployed in virtually any location in the world where a connection to the Internet is possible. Yet, data from these sensors may be analyzed alone or in conjunction with data from sensors deployed in any other location in the world.

To enable the use of existing networks and computation services, sensor units may be deployed in connection with sensors. The sensor units may perform one or more functions that facilitate wide scale deployment using existing networking and computation resources. Each sensor unit, for example, may process tag detection signals derived from the sensors to identify events. Events, for example, may indicate that a tag has entered or left a location in which the sensors are deployed or that a tag is present or was present in a location for an amount of time longer than a time interval. In some embodiments, sensor units may be configurable such that the type or types of events detected may be set for the sensor unit.

In support of this process, the sensor unit may include a memory and may store in the memory tag detection signals along with time stamps. Tag detection signals may be selectively stored, based on the utility of a tag detection signal in identifying an event of the type the sensor unit is programmed to recognize. Selective storing of the event signals may reduce hardware requirements for each sensor unit. Identification of an event related to presence of a tag at a location may be based on a plurality of tag detection signals including one or more tag detection signals stored in the memory of the sensor unit.

To facilitate operation over low cost networks with limited bandwidth, sensor units may also include memory that acts as a buffer for messages indicating a detected event to be sent to a server. If network connectivity fails or events are temporarily detected at a rate faster than messages reporting those events can be transmitted over the network, the messages may be buffered until network connectivity is restored or there is available network bandwidth for a message.

Such an RFID system may be used for any of a number of purposes. Some RFID systems are used to track one or more objects by tracking a tag attached to an object, where the tag contains electronically stored information that uniquely identifies the tag, and, by associating a specific tag to an object, the RFID system can be used to track the object. A tag detection signal may include tag identification information that identifies a certain tag and/or object. Identification of an event related to presence of a tag at a location may include comparing tag identification information associated with the tag and tag identification information for one or more stored tag detection signals. Stored tag detection signals with tag identification information that matches the tag identification information associated with the tag may be used to identify previous locations of the tag. For example, an RFID tag attached to the personnel's gear (e.g. helmet, badge) can be used to uniquely identify, and therefore track, the wearer of the gear. In some embodiments, for example, tracking may be performed by a cloud server or other computer processor that receives event indications from multiple sensor units.

As part of an RFID system, one or more antennas as part of a sensor system can be arranged to detect an object associated with a tag by sending interrogation signals and receiving response signals when the tag is located proximate to an antenna. By processing tag detection signals collected at multiple antennas deployed in one location, movement of an object into, out of, or within that location may be identified. By sending information about tags detected in multiple locations to a server or other processor, movement of objects across a wide area, including multiple locations, may be determined. Tag detection signals based on signals received by a first antenna may be compared to stored tag detection signals based on signals received by a second antenna. An event may be identified by comparing tag identification information of the tag detection signal associated with the first antenna and the stored tag detection signal associated with the second antenna. The event may indicate that the tag moved from a region proximate the second antenna to a region proximate the first antenna.

At each location, interrogation signals from an antenna may power a tag through electromagnetic induction when the tag is in proximity to the antenna, allowing an RFID tag to transmit an authentication response. By positioning one or more antennas at certain areas of interest at a location, information about a tagged object's movements and/or presence of the tagged object with respect to those areas of the location can be obtained by analyzing the signals received by the one or more antennas. For example, antennas placed within a building, such as in a doorway, can be used to detect personnel with tags passing through the doorway. Detection of users may be used for a variety of purposes, including safety requirements and security precautions. Additionally or alternatively, tags may be located on an object, such as a piece of equipment, and movement or presence of the object with respect to the one or more antennas can be detected through the signals received by the one or more antennas.

During implementation of an RFID system, an antenna receives signals from one or more tags when a tag is within an operating range or a certain physical proximity to the antenna. A tag detection signal indicates a presence of the tag within an operating range of the antenna and may be transmitted by the antenna to other components within an RFID system. The antenna may receive signals when a tag enters the operating range of the antenna and throughout the duration that the tag remains in the area of the operating range. Additionally, the antenna may stop receiving signals when the tag is no longer present within the operating range. Thus, the tag detection signals may be analyzed in order to identify event information, such as a tag entering, remaining, and/or leaving a region proximate to an antenna. By including multiple antennas within an RFID system, tag detection signals from the multiple antennas may be analyzed to identify event information, such as when a tag moves from the operating range of one antenna to the operating range of another antenna. In this manner, movement of an object or a person may be tracked by analyzing the tag detection signals from the multiple antennas. For example, an RFID system having one or more antennas on either side of a doorway may be used to track movement of a person associated with a tag across the doorway by identifying, from tag detection signals transmitted by the antennas, a direction of movement of the person such as the person entering or exiting the room.

In some embodiments, time information associated with a tag detection signal may identify a time when the tag detection signal was received by a sensor system. For example, a sensor system may be configured to identify the time when signals related to a tag detection signal are received by an antenna and provide a timestamp associated with the tag detection signal. Additionally or alternatively, a tag may be configured to transmit time information, and the time information may be received by an antenna in association with a tag detection signal. In some embodiments, a tag detection signal may include such time information, while in other embodiments, a separate time signal containing such time information may be transmitted by a tag. For example, a tag may transmit a timestamp signal when the tag transmits a response signal, and an antenna may receive both the timestamp signal and the response signal. Regardless of the mode of obtaining time information associated with tag detection signals, analysis of the time information and the tag detection signals may provide additional event information than through analysis of only the tag detection signals. Event information, derived from the tag detection signals, may then include a time associated with a particular event, such as a time when a person enters a room, or an amount of time a person spends in a room. In some embodiments, identification of an event may include comparing time information associated with a tag detection signal to time information associated with a stored tag detection signal.

The inventors have further recognized that in conventional operation of RFID systems that include processing of signals to determine event information, the tag detection signals are transmitted from the sensor over a network to a device that performs the processing. Depending on the geographical locations of the sensors and the processing device, transmission of the signals may occur over a local area network or a wide area network. The location of the additional device may depend on the type of environment the sensors are deployed and access of these sensors to a reliable communication network in order to transmit the signals to a remote device.

When RFID systems are deployed at locations with limited network connectivity, such as a low network bandwidth and/or a network with intermittent connectivity, transmission of signals to a remote device for further filtering and/or processing for event identification may become limited. Such reduced network connectivity may limit the performance of RFID systems to report events occurring where the sensors are deployed. An RFID system might transmit limited information by suppressing duplicate tag reads or tag detection signals and only transmitting unique tag IDs identified by antennas. However, such operation of RFID systems may limit the types of applications the RFID system can be deployed.

The inventors have appreciated that performance of RFID systems may be improved by reducing the amount of information transmitted by sensors to a remote device in order to accommodate limited network connectivity while retaining the processing capabilities to generate substantial information and analysis on objects that are being tracked. The amount of information may be reduced by sending messages, indicating events at a location, rather than every tag detection signal. Accordingly, some embodiments described herein relate to a sensor system configured to perform processing tasks on signals received by the sensor system to identify events related to the signals and transmit event information related to the events over a network to a server. By transmitting the event information instead of the tag detection signals, the amount of information transmitted is reduced while retaining functionality of the sensor system to detect movement and/or presence of tagged objects. The processing performed by the sensor system to filter the amount of signals to transmit over a network allows the RFID system to perform under a variety of network conditions, including transmitting of information over a wide area network. Additionally, in some embodiments, a sensor system may include one or more buffering capabilities to further improve transmission capabilities of a sensor system over a network.

The inventors have further appreciated that the implementation and use of an RFID system can be improved by providing techniques that allow for configuration of RFID sensors remotely. Accordingly, some embodiments described herein relate to a server or storage device configured to receive messages containing information from sensor systems, where the information may include event information identified by the sensor system and configuration parameters of the sensor system. The server may further analyze the event information and/or features of the signals related to the event information to confirm events and evaluate the configuration parameters of the sensor system. Event information from the message may be analyzed by identifying a portion of one or more events that consolidates a number of occurrences for an event type. Consolidating the number of occurrences for an event type may further reduce the amount of event information stored. As an example, if event information from a sensor system indicates a tag crossing an entryway multiple times over a certain amount of time, then the server may further analyze the event information and identify the tag as crossing the entryway in one direction such as entering a room. Events may be stored on a server and accessed by a user, such that the user can view event notifications, alerts, and/or status updates of the sensor system. Event information may include inventory management and/or meeting attendance. In some embodiments, processing of a message may include analyzing one or more events and features of the signals to identify information indicative of a status of the sensor unit. A message indicating the status of the sensor unit may be presented to a user.

Additionally, RFID sensor systems deployed at multiple locations may be used to detect and track objects at the multiple locations. Events derived by processing tag detection signals received by the sensors at the multiple locations may be collected and stored on a server. Collecting and analyzing event information from multiple locations may allow for more accurate processing or tracking of objects by having the event information accessible from one location. In this manner, related event information may be compared among the multiple locations as part of an analysis of the events. For example, as a person moves from one location to another, this movement may be detected by the multiple sensor systems such that events associated with the person may be obtained.

Components of a sensor system including sensors and the sensor units may be configured by providing one or more configuration parameters to the appropriate component of the sensor system. Configuration of a sensor system having a sensor unit and one or more sensors may be achieved locally and/or remotely through a server. Configuration parameters may be updated based on information of a received message and/or managed by a user accessing the server. Information generated by the server may be reported back to the sensor system including further analysis of the events and updates to configuration parameters may be transmitted back to the sensor system. The sensor units in one or more location may be updated by commands sent from the server. The server may determine which commands to send in any suitable way, including based on express user input identifying configuration parameters for sensor systems in specific locations or by automated processing of events. The updated configuration parameters may be used to change the mode of operation of one or more antennas.

An exemplary RFID system is illustrated in FIG. 1. The exemplary RFID system includes a reader or sensor unit having antennas 104a-f deployed at locations to detect tags 100a-b associated with objects. In this example the objects are people who are using tags, illustrated here as wearers 102a and 102b. In some embodiments, the RFID system is configured as an Active Reader Passive Tag (ARPT) system, and, in some embodiments, the RFID system is configured as an Active Reader Active Tag (ARAT) system. An antenna may receive a signal from a tag when the tag is proximate to the antenna. For example, user 102b wearing tag 100b is within a proximate range of antenna 104e such that antenna 104e may receive signals from tag 100b. In this manner, antennas may be arranged to track movement of tagged objects by placing the antennas at certain locations. For example, antennas 104a, 104b, 104c, 104d are arranged on either side of an entryway to a room, where antennas 104a and 104c are located outside of the room and antennas 104b and 104d are located inside of the room in order to detect a tag worn by a person who is either entering or leaving the room, such as wearer 102a wearing tag 100a.

As part of a sensor system deployed at a location, one or more antennas may be in communication with a sensor unit that receives tag detection signals from the one or more antennas, where the tag detection signals are based on the signals received by the antenna. The sensor unit may include ports to receive connections to the antennas, at least one processor, and at least one memory. Additionally, sensor unit may be in communication with a network, such as a local area network or a wide area network.

Any suitable number of antennas may be in communication with a sensor unit. Communication between an antenna and a sensor unit may occur in any suitable way, including wired and wireless communication. Such communication techniques may include a cabled connection, wireless local area network (LAN), a gateway to a wide area network, and cellular networks. For example, antennas 104a, 104b, 104c, and 104d are in communication with sensor unit 106a such that tag detection signals from antennas 104a, 104b, 104c, and 104d are transmitted to sensor unit 106a in response to an antenna receiving signals from a tag. As shown in FIG. 1, user 102a wearing tag 100a is closer to antennas 104b and 104d, and antennas 104b and 104d may transmit to sensor unit 106a tag detection signals indicating the presence of tag 100a proximate to antennas 104b and/or 104d. Similarly, antennas 104e and 104f are in communication with sensor unit 106b, and antenna 104e may transmit tag detection signals indicating tag 100b worn by user 102b is within a detection range of antenna 104e.

A sensor system may identify events by processing the tag detection signals, and the events may be transmitted by the sensor system to a server over a broad geographical area such as over a wide area network. In some instances, a sensor system may include a transmitter to transmit a message indicating the identified events. In some embodiments, the transmitter may be configured to transmit the message indicating the events over a wide area network to a server. In some embodiments, the transmitter may be configured as a local area network transmitter connected to a gateway that transmits over a wide area network. For example, a wireless link to a gateway may be used to transmit information over a wide area network to a server. As illustrated in FIG. 1, sensor units 106a and 106b communicate with server 110 over a wide area network. By processing the tag detection signals to identify events instead of transmitting each tag detection signal, the amount of information transmitted in a message from a sensor unit to a remote server can be reduced, and the ability of the RFID system to report detected events can be improved.

Upon receipt of a message indicating identified events, information about the identified events may be stored in one or more event data sets within the server. For example, server 110 contains one or more event data sets 115 configured to store events identified by sensor units 106a and 106b. Event data sets 115 may be configured in any suitable manner depending on the implementation of the RFID system and may include events identified from any number of locations with deployed sensor systems.

In some embodiments, server 110 is configured as a cloud service such that information stored on server 110 may be accessed remotely through one or more user interfaces by users to view information stored in the event databases. As illustrated in FIG. 1, user 102c may access one or more event databases 115 through user interface 125 configured to connect to server 110.

Additionally, server 110 may store one or more configuration parameters 120 for operating the sensor systems. The one or more configuration parameters may include parameters used to operate one or more sensor systems, including parameters used to operate one or more sensor units associated with antennas having transmission power and reception signal sensitivity for individual antennas, antenna placement information, and commissioning and decommissioning of individual antennas. Additionally, configuration parameters may include operational parameters for one or more sensor units, including indicator functions for identifying events, parameters for identifying events such as predetermined time intervals, heartbeat communication intervals, and data transmission intervals. Relevant configuration parameters may be transmitted to sensor units 106a and 106b and used to analyze tag detection signals for event identification. For example, configuration parameters relevant for antennas 104a-d and sensor unit 106a may be transmitted to sensor unit 106a.

Configuration parameters may be updated on a server located remotely from a sensor system, and subsequent synchronization of configuration parameters relevant to the sensor system may occur, allowing for remote configuration of the sensor system. In this manner, multiple sensor systems may be configured and managed through a centralized system by accessing a server that stores configuration parameters for the multiple sensor systems. As in some embodiments, server 110 is configured as a cloud storage device such that configuration parameter(s) 120 may be accessed remotely through user interface 125 by user 102c to view and/or modify one or more configuration parameters.

Using the techniques described herein, a centralized system may improve ease of deployment of RFID systems by allowing for delegation of installation tasks for sensor systems—such as installing the sensor system, attaching and detaching antennas, and connecting power—to personnel who do not require training on the configuration process for the sensor systems. Conventional RFID systems may be setup once during commissioning of sensor systems and require a user at the location to reconfigure the sensor system to reflect any changes to the configuration parameters. A centralized system allows for remote modification of configuration parameters such that a user can reconfigure multiple sensor systems without having to be on-site to access the sensor systems directly. Additionally, a centralized system allows for an RFID system to operate in a closed loop, with commands sent from the centralized system to sensor units. For example, such commands can minimize the chance of misappropriation of the sensor systems because, in some embodiments, the sensor systems can be decommissioned remotely by a command sent from the centralized system whenever needed.

Figure 2:
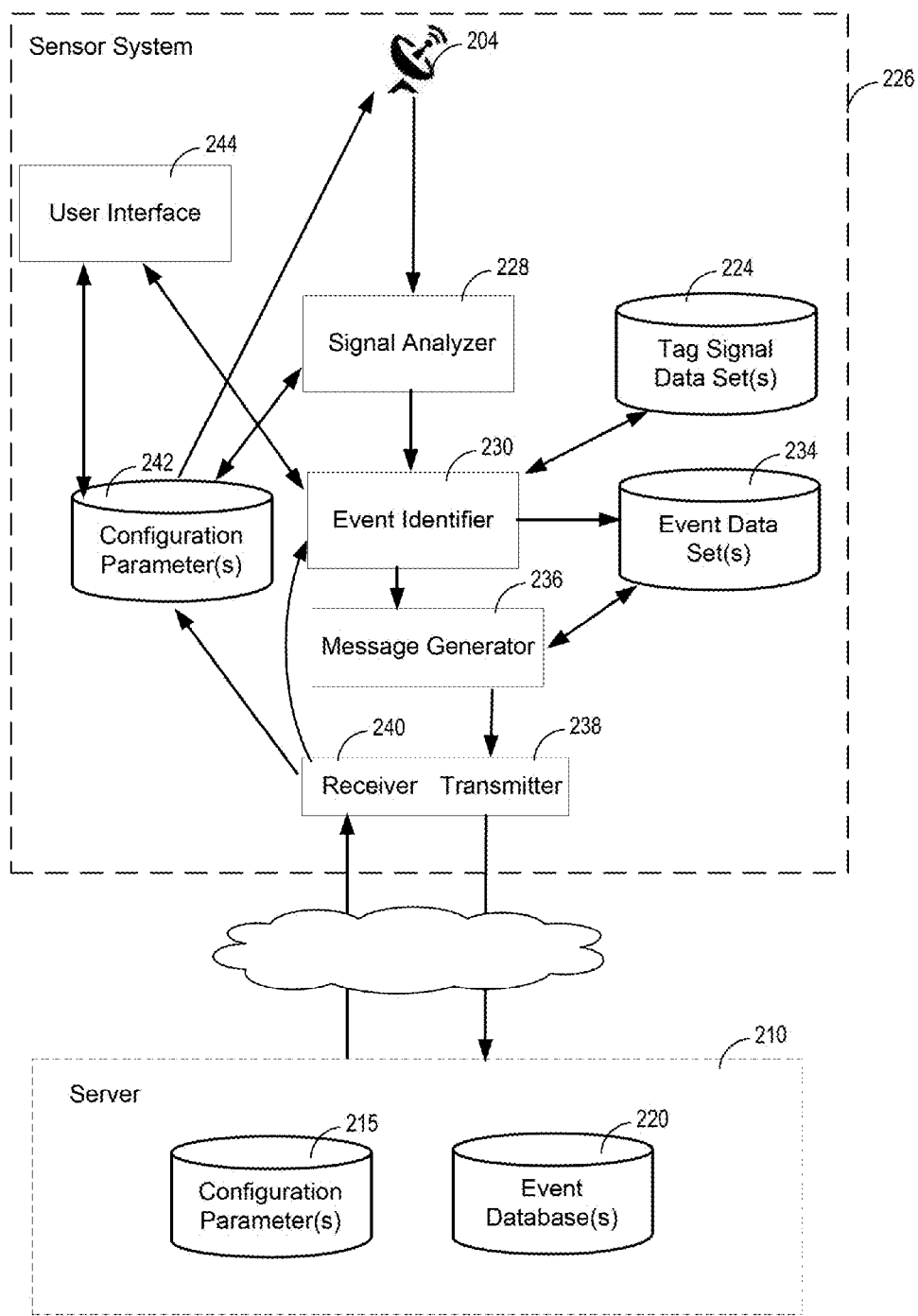
FIG. 2 is a functional block diagram of an exemplary sensor system and server as part of an RFID system.

According to the techniques of the present invention, a sensor system may include processing components implemented to process the received tag detection signals and store at least some of the tag detection signals. The processing components may process the tag detection signals and identify events such as the presence of an object in an area and movement of an object from one area to another area, including crossing an entryway of a room. A functional block diagram of an exemplary a sensor system and server is illustrated in FIG. 2. FIG. 2 illustrates representative functional portions of sensor system 226, which may be implemented in any suitable form, as embodiments are not limited in this respect. As depicted, exemplary sensor system 226 includes signal analyzer 228, event identifier 230, and message generator 236. Each of these processing components of sensor system 226 may be implemented in software, hardware, or a combination of software and hardware. Although the example operating environment of FIG. 2 depicts signal analyzer 228, event identifier 230, and message generator 236 implemented together on sensor system 226, this is only an example; in other examples, any or all of the components may be implemented on one or more separate machines, or parts of any or all of the components may be implemented across multiple machines in a distributed fashion and/or in various combinations. It should be understood that any such component depicted in FIG. 2 is not limited to any particular software and/or hardware implementation and/or configuration.

In some embodiments, signal analyzer 228 may be configured, such as through program instructions executed by one or more processors of sensor system 226, to analyze tag detection signals received by antenna 204 and determine information associated with the tag detection signals. That associated information may include tag identification information, time information, one or more features of the signals, and configuration parameters of sensor system 226. The tag identification information associated with a tag detection signal may uniquely identify the tag that transmitted the signals received by an antenna. Information stored on the tag may include identification information, such as a tag ID, and may be transmitted to antenna 204 when the tag is proximate to antenna 204. In some embodiments, time information associated with when the tag is detected by antenna 204 may be acquired. The time information may include a timestamp provided by a sensor unit that indicates a time associated with a received signal. In some embodiments, signal analyzer 228 may provide a timestamp or other suitable time indicator upon receiving a tag detection signal. In such embodiments, signal analyzer 228 may communicate with a clock of sensor system 226 or otherwise contain components that can access time information in order to identify time information associated with a received tag detection signal. Additionally, antenna 204 may transmit one or more features of the signals received by antenna 204 as part of a tag detection signal. Such features may include a power used to transmit interrogation signals from antenna 204 and the strength of a signal received by antenna 204 in response to the interrogation signals.

In some embodiments, a tag detection signal may also include one or more configuration parameters of sensor system 226, such as information identifying the location of antenna 204 and/or configuration of processing tasks for tag detection signals provided by antenna 204. The location and/or operational mode of antenna 204 may be used in subsequent processing to identify events from the tag detection signals transmitted by antenna 204. Such modes may include a presence mode where a tag's arrival or exit from a proximate range of an antenna are reported as events, a muster mode where a tag is first detected within a proximate range of an antenna is reported as an event, and portal mode where a tag is identified as crossing from a proximate range of one antenna to a proximate range of a second antenna. Portal mode could be used to detect a tag crossing an entryway to a room where a first antenna is located inside the room and a second antenna is located outside of the room. In such embodiments, the first antenna's mode indicates a location on the inside of the room and the second antenna's mode indicates a location on the outside of the room. In some embodiments, configuration parameter(s) 242 for individual antennas may be stored within sensor system 226 such that signal analyzer 228 may retrieve a configuration parameter for a tag detection signal. In such embodiments, a tag detection signal may include identification information for antenna 204, and signal analyzer 228 may retrieve a location and/or a mode for antenna 204 from configuration parameter(s) 242.

In some embodiments, signal analyzer 228 may provide information to event identifier 230 about the tag detection signal it has analyzed. In some embodiments, signal analyzer 228 may provide tag identification information, time information, and/or antenna configuration parameters. Event identifier 230 may further process the information provided by signal analyzer 228 in order to identify one or more events related to the presence of a tag at a location of antenna 204. Information provided by signal analyzer 228 may be used by event identifier 230 to determine the type of processing and analysis to perform to evaluate whether an event has occurred. In some embodiments, signal analyzer 228 may identify, in response to receiving a tag detection signal an antenna, an operational mode for the antenna, and the operational mode may determine subsequent processing of the tag detection signal by event identifier 230.

In some embodiments, tag detection signals stored in sensor system 226 may be used to identify events related to an incoming tag detection signal from antenna 204. Within sensor system 226, tag detection signals may be selectively stored in one or more tag signal data sets 224. In some embodiments, stored tag detection signals in one or more tag signal data sets 224 may include previously received tag detection signals, and in some embodiments, the one or more tag signal data sets 224 may include tag detection signals relevant to previously identified events.

Tag detection signals may be stored in one or more tag signal data sets 224 in any suitable configuration. In some embodiments, stored tag detection signals may be organized based on antenna information such as the antenna's location and/or mode of operation used to identify a type of event associated with the stored tag detection signals. Some embodiments may configure one or more tag signal data sets 224 as one or more tag read lists, where each tag read list is associated with the identification of a type of event and the tag detection signals stored as entries in the read list are related to the type of event. In this manner, relevant tag detection signals are stored in a tag read list and can be searched by accessing the tag read list. Additionally or alternatively, one or more tag signal data sets may be organized based on one or more sensor systems and/or location of one or more antennas. By constructing tag signal data sets based on sensor systems, event identifier 230 may process a tag detection signal received from a sensor system by accessing information relevant to other tag detection signals in the sensor system.

Event identifier 230 receives information related to an incoming tag detection signal provided by signal analyzer 228 and, by processing the information, may identify an event. An event may be identified in any suitable manner according to the desired use of the RFID system. The events may be identified based on multiple tag identification signals, which may entail tag identification signals collected by the same antenna at different times or at different antennas at the same or different times. In some embodiments, an event is identified when a tag detection signal corresponding to a tag includes tag identification information that matches the tag identification information of a tag detection signal stored in one or more tag signal data sets 224. In some embodiments, an event is identified when a tag detection signal identifying a tag is transmitted by a first antenna and a tag detection signal identifying the tag is transmitted by a second antenna. Some embodiments may identify events based on time information associated with tag detection signals, where an event is identified by comparing time information for an incoming tag detection signal to time information associated with one or more tag detection signals stored in one or more tag signal data sets 224. In some embodiments, an event is identified by comparing a difference between the time information of an incoming tag detection signal with time information associated with a stored tag detection signal to a time interval. The time interval may be a predetermined time interval and/or a configurable parameter where the value can be changed while the sensor system is in operation. The incoming tag detection signal and the stored tag detection signal may have distinct tag identification information. Since an antenna continues to receive signals from a tag located proximate to the antenna, some embodiments may identify an event by an absence of a tag detection signal corresponding to the tag for an amount of time exceeding a time interval.

Some embodiments may identify, by processing a tag detection signal, one or more stored tag detection signals to remove from one or more tag signal data sets 224. In some embodiments, a stored tag detection signal may be modified to reflect an identified event. By updating the stored tag detection signals based on identified events, the one or more tag signal data sets 224 may improve the speed or accuracy of identifying subsequent events. For example, as a person crosses an entryway into a room with an antenna located on the outside and an antenna located on the inside of the room, a tag worn by the person may be detected by the outside antenna followed by the inside antenna, and an event indicating that the person is incoming may be identified. As a result, signals indicating the tag received by the outside antenna and information from a related tag detection signal may be stored in a tag signal data set, which may be used to identify movement of the person across the entryway when signals indicating the tag are received by the inside antenna. After identifying that the tag, and thus the person, has moved inside the room, the tag signal data set may be updated to reflect the movement of the tag by removing from the tag signal data set the stored tag detection signal related to the event from the outside antenna. The stored tag detection signal may be deleted from the memory of the sensor unit.

In some embodiments, a stored tag detection signal may be removed from a tag signal data set based on time information associated with the stored tag detection signal. Some embodiments may update a tag signal data set by removing a stored tag detection signal when the time information associated with the stored tag detection signal is greater than a predetermined time interval indicating that a certain amount of time has passed since the stored tag detection signal was received. The stored tag detection signal may be deleted from the memory of the sensor unit when a difference between time information associated with the stored tag detection signal and a current time is greater than a predetermined time interval.

Stored tag detection signals identified for deletion from the sensor unit's memory may include tag detection signals identified as "orphaned" tag detection signals such as tag detection signals indicating signals received by a single antenna. Orphaned tag detection signals may be identified when a sensor system is operating in a portal mode and there is a discrepancy between detection inside and outside a room or area. A tag detection signal may be identified as an orphaned tag detection signal when a difference between the time information associated with the tag detection signal and the time information associated with a stored tag detection signal is greater than a time interval. Tag identification information associated with the tag detection signal may be distinct from tag identification information associated with the stored tag detection signal, indicating a discrepancy between in tag identification information for the two tag detection signals.

In some embodiments, information related to an identified event may be stored in one or more event data sets 234. Information stored in event data set(s) 234 may include tag identification information associated with the event, a type of event, time information associated, and signal features related to the tag detection signal that indicated the event. Event data set(s) 234 may be organized and structured by type of event, sensor system, and/or events identified for upload to a device or server. While information related to events identified by processing tag detection signals by sensor system 226 may be stored locally in one or more event data sets 234, the information related to events may also be transmitted to another device or system, such as server 210. Sensor system 226 may construct event data set(s) 234 to indicate the event information has been transmitted to server 210 and the event information, which may be more recent, to be transmitted.

Some embodiments may issue an alert to a user of the RFID system in response to the identification of a particular event type, including error signals, unauthorized movement of objects or users, and/or safety notifications. In some embodiments, one or more tag signal data sets may identify tags associated with objects or users with limited or restricted access to certain locations. Some embodiments have tag signal data sets that include tag identification information for certain tags and types of alerts to issue if a tag detection signal having tag identification information stored in the tag signal data sets is identified. In this manner, a processing component may issue an alert in response to identification of an event type which may be determined by comparing tag identification information associated with an incoming tag detection signal to tag identification entries in the tag signal data sets. The alert may be reported by sensor system 226 through user interface 244 having any suitable indicator, including one or more audible and/or visible indicators such as an alarm and indicator lights. The alert may indicate any suitable type of event. For example, alerts may indicate access to a certain area, such as a room, by a person who has restricted access to the room or area. The ability to process information locally on the sensor system allows for the detection of tags even when there is an absence of connection to a remote device, such as server 210.

Additionally, server 210 may provide to a sensor system one or more tag signal data sets used for identifying events that indicate an alert to be issued. The one or more tag signal data sets may indicate privilege settings for certain tags or users associated with certain tags identified in the one or more tag signal data sets. Some embodiments may have tag signal data sets, which may include whitelists and/or blacklists of tag identification information such as a tag ID. When an event is identified by event identifier 230, an alert may be issued locally by sensor system 226. Information related to the event may be stored in an event data set identified for upload to server 210, allowing a user to remotely receive the event and/or the alert. In some embodiments, event information related to an alert may be further processed by server 210 to verify the occurrence of the event and/or identify more details about the status of the alert.

Message generator 236 may construct a message including information provided by event identifier 230 and/or one or more event data sets 234. Message information may include event information, status of the sensor system, and alert notifications. Message generator 236 may construct messages to include event information that has been added to event data set(s) since a previous message was transmitted, allowing for recently identified events to be synchronized with a remote device. In some embodiments, a message may include diagnostic information such as condition of a power supply, backup battery status, sensor system temperature, intrusion detection, network connectivity status, and out-of sequence data. In some embodiments, message generator may construct messages to include information about incoming signals to the sensor system such as custom signals from a user pushing a button on user interface 244. Additionally, some embodiments may include performance metrics of individual antennas such as features and/or quality of the signals received by the individual antennas. In some embodiments, a message may indicate a periodic signal to indicate a status of the sensor system to a device receiving the message. Such periodic messages may be generated and transmitted at configurable intervals and may include heartbeat communication techniques, allowing a remote device lacking the ability to directly interrogate a connected sensor system to monitor the status of a sensor system through the received periodic messages.

Messages constructed by message generator 236 may be provided to transmitter 238 which transmits the message to server 210. In some embodiments, transmitter 238 is configured to transmit messages across a wide area network to server 210. To account for intermittent connectivity when transmitting messages across a network with varying quality, sensor system 226 may include a data buffer configured to store a portion of a message during transmission to prevent loss of outgoing messages from sensor system 226. The data buffer may be configured to store a portion of a message when the transmitter is unable to transmit the message. By providing a data buffer as part of transmitting messages, an RFID system is able to handle both transient outages in communication as well as bandwidth restrictions when transmitting data. In some embodiments, the data buffer is configured to transmit a message when sensor system 226 is in communication over a network to server 210 and to store a portion of the message yet to be transmitted when communication is interrupted. Any suitable number and/or types of data buffers may be provided to a sensor system to handle intermittent network connection and network quality and improve performance of an RFID system.

In some embodiments, in-memory buffering techniques may be used by sensor system 226 such that data collection and tag detection signal processing are separate from message generation and transmission. In-memory buffering may allow for processing of tag detection signals to occur at a different processing speed than the transmission of a message, reducing the impact of variations in message transmission speed on processing speed for incoming tag detection signals. Some embodiments may employ on-disk buffering techniques to further resolve network connectivity issues by temporarily storing unsent data in a memory such as a flash memory configured to reestablish transmission of the data when connectivity returns. The memory may be further configured to maintain the sequence of the original message during intermittent network connectivity such that server 210 received the message in the intended sequence. In the event of failure of sensor system such as a hardware malfunction or failure, the on-disk buffer containing the stored message can be transferred to a replacement device, minimizing the loss of information obtained by the sensor system.

Messages may also be received by sensor system 226 from server 210. Receiver 240 associated with sensor system 226 may be configured to receive messages transmitted by server 210 over a network. In some embodiments, receiver 240 may be configured to receive messages from server 210 across a wide area network. Any suitable technique for establishing communication and transmission of messages from server 210 to sensor system 226 may be used.

Some embodiments relate to techniques for configuring a sensor system and a server when the sensor system is not directly accessible by the server. In such embodiments, the server is unable to provide messages directly to the sensor system. Communication between the server and the sensor system can be established by configuring the sensor system to transmit messages to the server and the server to transmit a response message to the sensor system in response to receiving a message from the sensor system. Configuring outgoing communication from a sensor system to a server that signals the server to provide a response message allows for bidirectional communication between the deployed sensor system and server. These communication techniques may be implemented in RFID systems where communication from the server to the sensor system is blocked, such as by network operators (e.g., blocking of a wide area network by mobile operators). Such communication techniques may be referred to as heartbeat communication. In some embodiments, messages may be periodically generated and transmitted by the sensor system. A time interval for transmitting messages by the sensor system may be set at predetermined intervals or at configurable intervals provided by a configuration parameter.

Such techniques may be implemented in RFID systems where one or more sensor systems are inaccessible from outside the local network of the one or more sensor systems. In embodiments where sensor system 226 is inaccessible directly from server 210, sensor system 226 may receive a message from server 210 in response to sensor system 226 transmitting a message to server 210. The transmitted message may indicate to server 210 that a response message be transmitted to sensor system 226. The response message may contain information stored on server 210 such as configuration parameters 215 and events stored in event databases 220. In some embodiments, the transmitted message may include information identifying sensor system 226, and server 210 may be configured to use the identification information to transmit a response message for receipt by sensor system 226. In some embodiments, messages may be periodically generated and transmitted by sensor system 226 to server 210. A time interval for transmitting messages by sensor system 226 may be a predetermined interval or a configurable interval set by a configuration parameter.

A response message transmitted by server 210 to sensor system 226 may include event information. Receiver 240 may then direct event information from the response message to event identifier 230. Event identifier 230 may update the event information stored in event data sets 234. In this manner, event information stored on server 210 may be synchronized with event information stored on sensor system 226. Event identifier 230 may provide a message containing the event information from the response message to user interface 244. For example, server 210 may determine that certain event information indicates an alert situation and provide a message to sensor system 226 to indicate a status alert such as a switching on an alert light.

Figure 3:
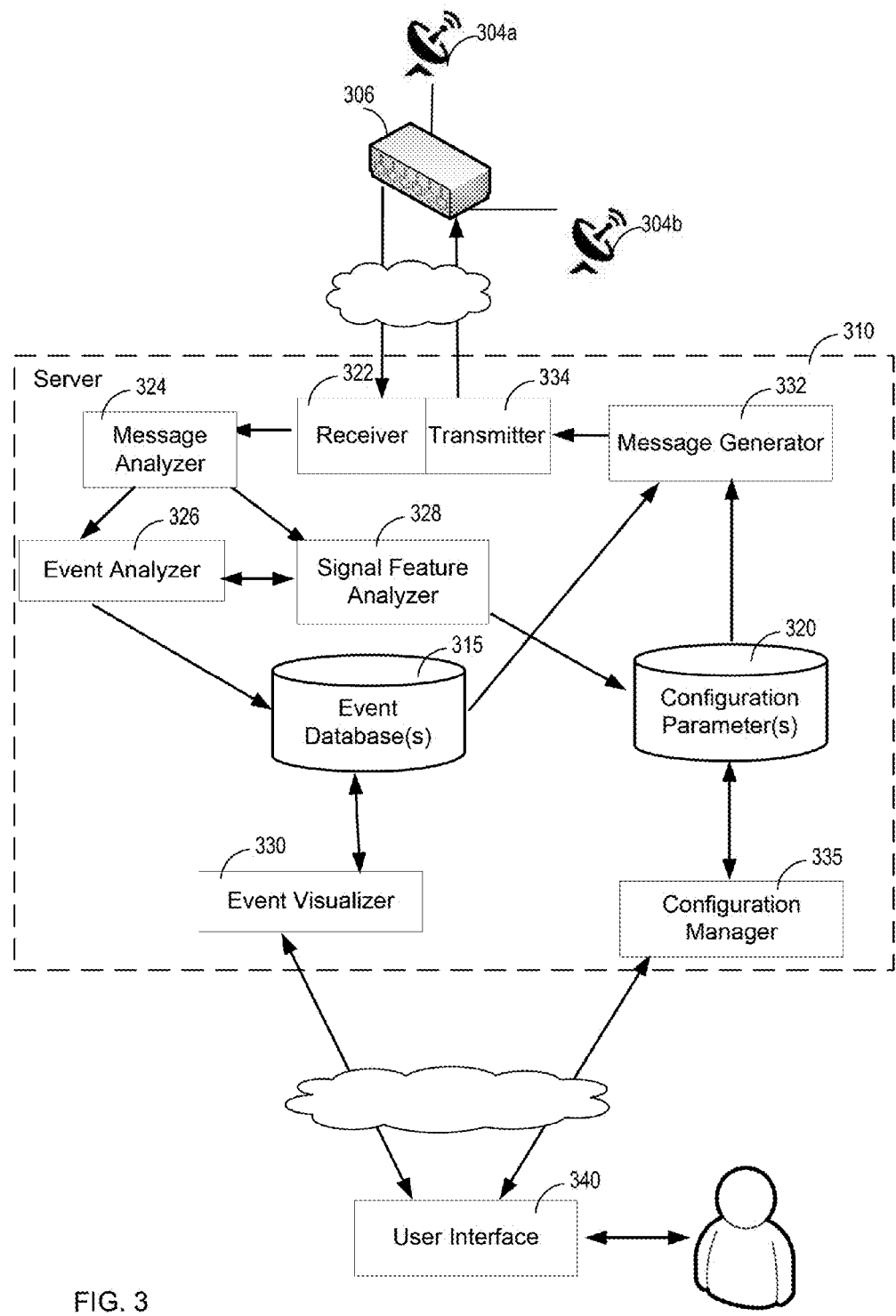
FIG. 3 is a functional block diagram of an exemplary server configured to receive messages from a sensor system.

According to the techniques of the present invention, a server configured to receive messages from one or more sensor systems may include processing components implemented to process the received messages identifying events detected by a sensor system and features of signals associated with the events, update one or more configuration parameters for a sensor system, and generate a message to be transmitted to a sensor system. A functional block diagram of an exemplary server configured to receive messages from a sensor system is illustrated in FIG. 3. The exemplary operating environment includes server 310, which may be implemented in any suitable form, as embodiments are not limited in this respect. As depicted, exemplary server 310 includes message analyzer 326, signal feature analyzer 328, event visualizer 330, configuration manager 335, and message generator 332. Each of these processing components of server 310 may be implemented in software, hardware, or a combination of software and hardware. Although the example operating environment of FIG. 3 depicts message analyzer 326, signal feature analyzer 328, event visualizer 330, configuration manager 335, and message generator 332 implemented together on server 310, this is only an example; in other examples, any or all of the components may be implemented on one or more separate machines, or parts of any or all of the components may be implemented across multiple machines in a distributed fashion and/or in various combinations. It should be understood that any such component depicted in FIG. 3 is not limited to any particular software and/or hardware implementation and/or configuration.

In some embodiments, message analyzer 324 may be configured, such as through program instructions executed by one or more processors of server 310, to analyze messages received by receiver 322 from a sensor system component such as sensor unit 306 and determine the type of information associated with the message such as events, alert notifications, sensor status, features of signals, and configuration parameters. Event information may include the type of event and the time the event was detected by a sensor system. Any other suitable type of information may be communicated in a message from a sensor unit, and may be extracted by message analyzer 324. Other examples include operating parameters of the sensor unit and/or characteristics of signals measured, such as the signal strength or signal to noise ratio of the tag detection signals used in identifying an event.

Message analyzer 324 may provide relevant event information to event analyzer 326 and signal feature information to signal feature analyzer 328. In some embodiments, message analyzer 324 may analyze the stability of the overall infrastructure of the RFID system including the quality of the network connection. In some embodiments, message analyzer 324 may analyze the operational status of one or more sensor systems, including power supply, backup power supply, and/or an alert notification such as an intrusion alert.

In some embodiments, event analyzer 326 may be configured, such as through program instructions executed by one or more processors of server 310, to analyze event information received by message analyzer 324 further to distinguish and filter the event information. In some embodiments, event analyzer 326 may analyze event information to identify redundant information, and event analyzer 326 may process the event information to reduce and/or remove the redundant information. By reducing the amount or redundant information present in the event information, the potential impact for misconfiguration of a sensor system to introduce artifacts may be reduced. Events identified by a sensor system may include multiple movement events recorded within a short time period and consist of redundant or unnecessary information. By identifying a portion of the events that consolidates a number of occurrences for an event type, the amount of event information may be reduced. For example, a sensor system configured to track movement inside and outside of a room may identify tag movements consisting of a tag moving inside, then outside, followed by inside the room over a short period of time. Event analyzer 326 may analyze such a sequence of events and determine that a single movement into the room was made by the tag. Some embodiments may process event information based on features of the signals, including signal quality and/or strength used to identify the events such that signals having a certain quality are used to identify events.

Events analyzed by event analyzer 326 may be stored in one or more event databases 315. Information stored in event database(s) 315 may include information from multiple sensor systems and sensor systems at multiple locations. A user may view the event information stored in one or more event databases through event visualizer 330 which may be configured to access the event information and present the information on user interface 340. In this manner, a user may access the event information stored on server 310 over a network through any suitable user interface or device without having to be physically located where the sensor systems providing the event information are deployed.

In some embodiments, signal feature analyzer 328 may be configured, such as through program instructions executed by one or more processors of server 310, to analyze features of signals received by one or more antennas. Signal feature analyzer 328 may analyze features of the signals received by antennas and update one or more configuration parameters for the antennas based on the analysis of the features. Configuration parameter(s) 320 stored on server 310 may be updated to reflect the analysis of signal feature analyzer 328. In some embodiments, signal feature analyzer 328 may identify antennas acquiring signals with a low strength and update one or more configuration parameters such as the power setting for the antennas. By having server 310 analyze the signals received by antennas to evaluate the configuration parameters of the antennas, updating the configuration parameters may improve overall performance of the RFID system and can automatically occur without involving direct input by a user. However, it should be appreciated that, in other embodiments, some or all of the analysis described as performed in the analyzers 324, 326 and 328 could alternatively or additionally be performed in one or more of the sensor units.

Some embodiments may analyze both event information and signal features to identify one or more configuration parameters to update. Signal feature analyzer 328 may include event information provided by event analyzer 326 during analysis of the signals received by antennas related to the event information. In some embodiments, signal feature analyzer 328 may identify a quality of signals related to certain events and update the configuration parameters for antennas that received the signals. For example, event information either provided by a sensor system or event analyzer 326 may indicate stray or "orphaned" tag detection signals such as tag detection signals indicating signals received by a single antenna. Orphaned tag detection signals may be identified when a sensor system is operating in a portal mode and there is a discrepancy between detection inside and outside a room or area. Combining analysis of event information and signal features may improve detection of events by an RFID system. As an example, events may be distinguished by signal strength such that events having a high signal strength may indicate a movement by a user or object to store in event database(s) 315, while events having a low signal strength indicate an orphaned tag detection signal and the associated event may be identified as not indicating movement of the user or object and may be removed from event database(s) 315.

Additionally or alternatively, a power setting for one or more antennas receiving lower strength signals may be adjusted to improve signal strength and/or event identification. For example, a large number of orphaned tag detection signals may indicate that an antenna's power setting is too high, and the antenna's configuration parameters may be updated to lower its power setting. As another example, a majority of signals received by an antenna may have low signal strength, indicating that the power setting of the antenna is too low, and configuration parameters may be updated to increase the antenna's power setting. In another example, the signal strength of signals received by an antenna may be proximate to the detection sensitivity setting for the antenna, and data quality may be improved by increasing the sensitivity setting.

Additionally or alternatively, a user may access one or more configuration parameters 320 stored on server 310 and edit or update the one or more configuration parameters 320 through configuration manager 335. Configuration manager 335 may provide configuration parameters to user interface 340 where a user can view, add, and/or modify one or more configuration parameters, and configuration parameter(s) 320 stored on server 310 may be updated to reflect any changes. In some embodiments, a user may have limited access to configuration parameters for certain sensor systems, allowing for configuration of the RFID system to be restricted to some individuals.

In some embodiments, message generator 328 may be configured, such as through program instructions executed by one or more processors of server 310, to construct a message based on event information, configuration parameters, alert notifications, and/or status signals relevant to a sensor system. The sensor system may include sensor unit 306 and antennas 304a-b. Although two antennas are shown in FIG. 3, any suitable number of antennas may be included in a deployed sensor system. A message may contain updates to event database(s) 315 identified by event analyzer 326 and/or configuration parameter(s) 320 identified by signal feature analyzer 328. Some embodiments may implement heartbeat communication techniques where sensor unit 308 may transmit a message to server 310. The message may include a query related to whether there are configuration updates available. If there are configuration updates available, then message generator 332 may generate a message in response to the query, and server 310 may transmit the message containing information about the configuration updates to the sensor system. In this manner, bidirectional communication between sensor unit 306 and server 310 may occur by allowing outgoing messages from sensor unit 306 that signals server 310 to provide a response message to sensor unit 306. These communication techniques may be implemented in RFID systems where communication from server 310 to sensor unit 306 is blocked (e.g., blocking of a wide area network by mobile operators).

Transmitter 334 may be configured to transmit a message constructed by message generator 332 to a sensor system identified as the intended recipient for the message. In some embodiments, transmitter 334 is a wide area network transmitter configured to transmit messages over a wide area network. Some embodiments may include one or more data buffering techniques, such as techniques previously described in the context of sensor system 226, for transmitting messages by server 310 in order to improve performance of communication between server 310 and sensor system when a network has bandwidth and/or connectivity problems.

Sensor system 226 and/or server 310 may be implemented as a single stand-alone machine, or may be implemented by multiple distributed machines that share processing tasks in any suitable manner. In some embodiments, sensor system 226 and/or server 310 may include one or more tangible, non-transitory computer readable storage devices storing processor-executable instructions, and one or more processors that execute the processor-executable instructions to perform the functions described herein. The storage devices may be implemented as computer-readable storage media (i.e. tangible, non-transitory computer-readable media) encoded with the processor-executable instructions.

Components implemented with software may comprise sets of processor-executable instructions that may be executed by the one or more processors of sensor system 226 and/or server 310 to perform the functionality described herein. Components may be implemented as separate components (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of components of sensor system 226 and/or server 310 may be implemented as a set of multiple software and/or hardware components.

In some embodiments, processing of tag detection signals by a sensor system may include identifying one or more types of events the sensor system is configured to detect. Sensors, as part of a sensor system, may be positioned and arranged such that analysis of tag detection signals may identify a specific type of event. When a sensor system is configured to detect a particular type of event, it may be referred to as operating in a certain type of mode. Configuration information related to operational mode and/or type of events detected by a sensor system may be stored on the sensor unit and/or on the sensors. By identifying the mode of a sensor system, tag detection signals may be analyzed according to processing tasks specific to the mode. Some embodiments relate to sensor systems configured to operate in a portal mode where sensors are arranged on either side of an entryway and analysis of tag detection signals may indicate that an object or person crossing the entryway as a type of event. In this manner, a sensor system may operate in a mode referred to as a "portal mode." As part of this analysis, one or more sensors may be designated as being located on either side of the entryway, such as being located either inside or outside a room. By using such location information for the sensors, the direction of an object that crosses the entryway may be identified as either entering the room or leaving the room. Sensors located inside a room may be referred to as "IN" antennas, and tag detection signals originating from these sensors may be analyzed according to a "Portal IN" process. While sensors located outside a room may be referred to as "OUT" antennas, and tag detection signals originating from these sensors may be analyzed according to a "Portal OUT" process.

Some embodiments relate to sensor systems configured to operate in a "presence" mode where analysis of tag detection signals includes identifying types of events that include a tag's arrival and/or departure from a region in proximity to one or more sensors. As part of this analysis, time information related to when tag detection signals are received may provide information about the times are which arrival and/or departure occur. Tag detection signals from sensors associated with a sensor system configured to operate in presence mode may be analyzed according to a "Presence" process.

In some embodiments, sensor systems may be configured to operate in a "muster" mode where analysis of tag detection signals includes identifying types of events that include a tag's arrival at a certain location. Tag detection signals from sensors associated with a sensor system configured to operate in muster mode may be analyzed according to a "Muster" process. The above types of events are exemplary as techniques of the present application are not limited to the type of event detected by a sensor system. Additionally or alternatively, a sensor system may be configured to operate in multiple modes and/or identify multiple types of events.

Figure 4:
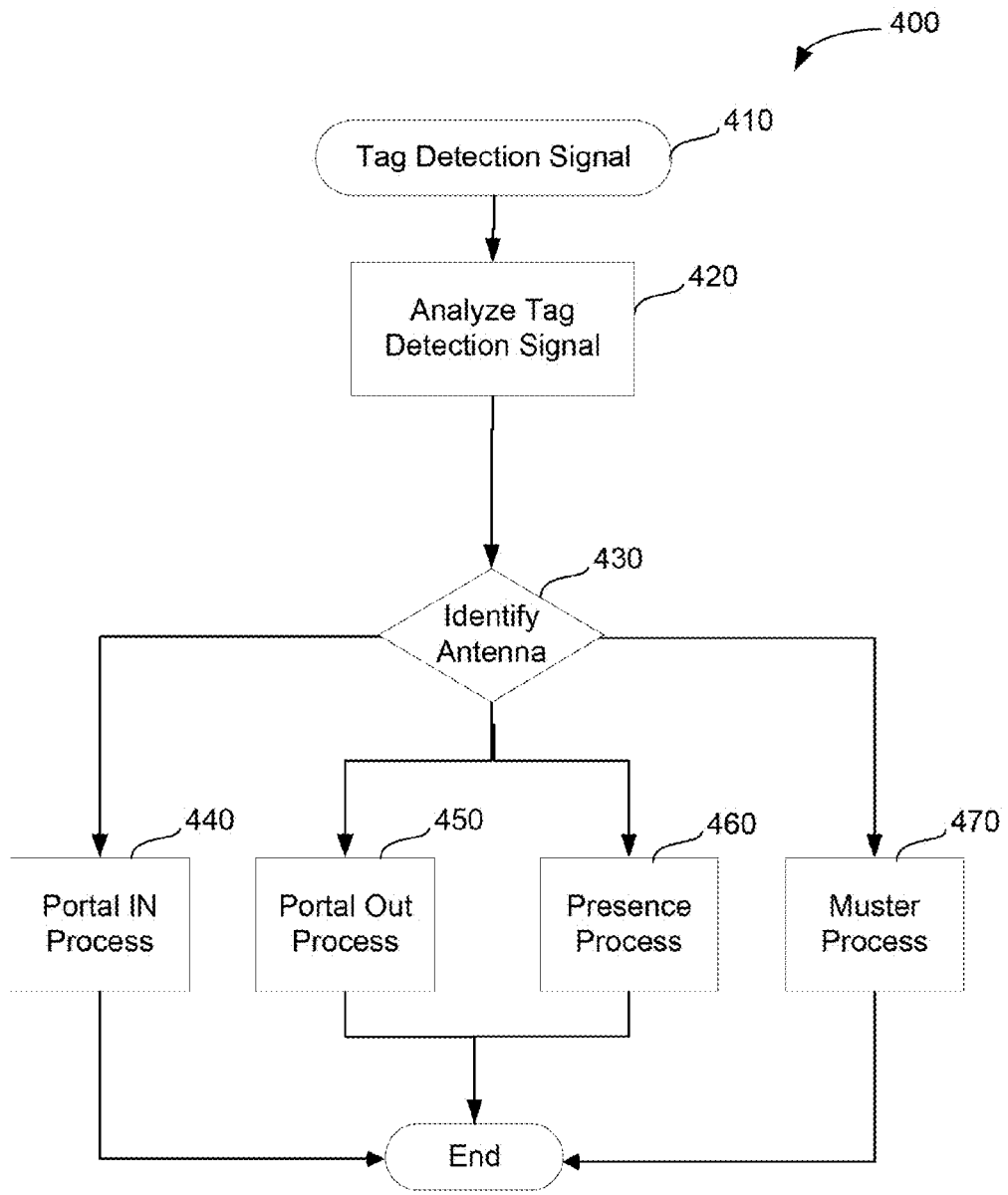
FIG. 4 is a flowchart illustrating an exemplary method for identifying processing tasks for event identification related to a tag detection signal.

As tag detection signals are received, the operational mode of the sensor system associated with the antenna that provided the tag detection signal may be identified in order to determine how to process the tag detection signal. Processing tasks may be determined based on identification of the antenna that provided the tag detection signal. The sensor system may use the antenna identification information to identify a set of processing tasks to perform that may identify a particular type of event for the tag detection signal. One exemplary embodiment for identifying processing tasks for event identification related to a tag detection signal is illustrated in FIG. 4. Method 400 may be performed, for example, by one or more components of sensor system 226 such as signal analyzer 228 and/event identifier 230, although other implementations are possible and method 400 is not limited in this respect. Method 400 begins at act 410, when a tag detection signal is received by sensor system 226. As discussed above, a tag detection signal may be provided by an antenna based on signals received by the antenna, where the signals are indicative of a tag proximate to the antenna.

At act 420, the tag detection signal may be analyzed, including identifying tag identification information, time information associated with the tag detection signal, and/or features of the signals received by the antenna related to the tag detection signal transmitted by the antenna. As discussed above, the tag identification information uniquely identifies the tag based on the signals received by the antenna. Time information associated with the tag detection signal may include a time indicator such as a timestamp provided by the sensor system in response to receiving the signals. Features of the signals received by the antenna may include the strength of the signals received by the antenna.

At act 430, the antenna transmitting the tag detection signal may be identified, including identifying one or more configuration parameters of the antenna such as a location of the antenna and/or operational mode of the antenna. In some embodiments, a tag detection signal provided by an antenna may include information about the antenna's configuration parameters and/or operational mode, while in some embodiments, the antenna's configuration parameters may be identified by accessing configuration parameters stored in a sensor system based on the antenna identification information included in a tag detection signal. Identification of the antenna at act 430 may indicate subsequent processing tasks for analysis of the tag detection signal in act 420. As illustrated in exemplary method 400, information identifying the antenna at step 430 may indicate processing tasks for the tag detection signal which may identify an event by Portal IN process 440, Portal OUT process 450, Presence process 460, and/or Muster process 470. Each one of processes 440, 450, 460, and 470 includes processing tasks to identify a type of event based on the tag detection signal, one or more stored tag detection signals, and time information associated with the tag detection signal and/or the one or more stored tag detection signals. For example, an antenna located inside of a room may be identified such that tag detection signals are further processed by Portal IN process 440. Identification information for the antenna may indicate that the antenna is an IN antenna and tag detection signals associated with the antenna are processed according to Portal IN process 440. An event identified by Portal IN process 440 may relate to a tag's presence at the location of the antenna inside the room, indicating that a user associated with the tag as entered the room.

Figure 5:
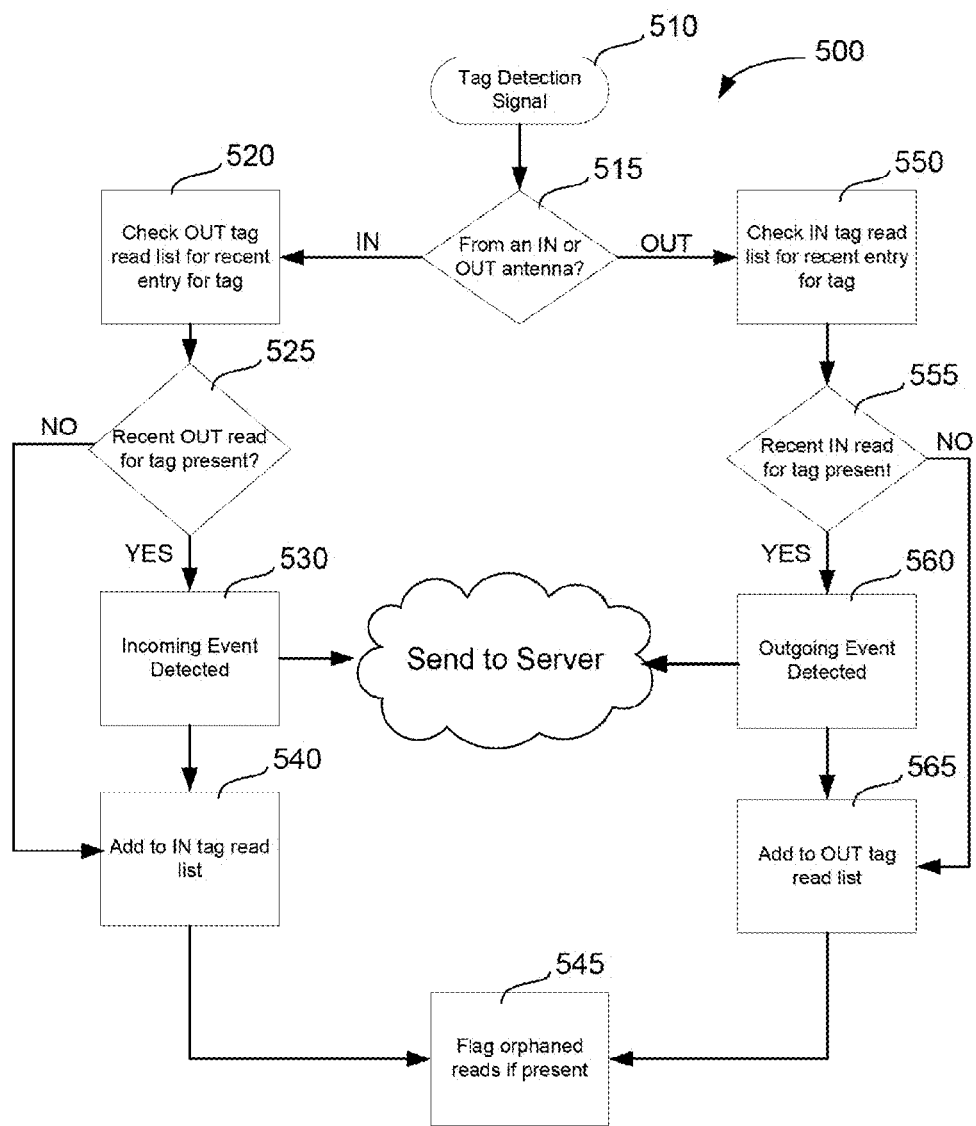
FIG. 5 is a flowchart illustrating an exemplary method for processing tag detection signals received from antennas configured to operate in portal mode.

One exemplary embodiment for processing tag detection signals received from antennas configured to detect movement across an entryway by operating in portal mode is illustrated in FIG. 5. Method 500 may be performed, for example, by one or more components of sensor system 226 such as signal analyzer 228 and/event identifier 230, although other implementations are possible and method 500 is not limited in this respect. Method 500 begins at act 510, at which a tag detection signal is received by sensor system 226. As discussed above, a tag detection signal may be provided by an antenna and include tag identification information. At act 515, information associated with the tag detection signal may be used to identify whether the antenna providing the tag detection signal is identified as either an antenna located in an area and designated as an "IN antenna" or an antenna located outside the area and designated as an "OUT antenna." Information indicating how the antenna is designated during configuration may be used to determine subsequent processing tasks.

Processing proceeds to act 520 when the antenna is identified as an IN antenna, and, at act 520, tag identification information for the tag detection signal is compared to information for stored tag detection signals received from one or more OUT antennas contained in a tag read list. If there is an entry in the OUT tag read list corresponding to the tag identified by the tag detection signal, then processing proceeds to act 525 where time information for the entry in the OUT tag read list is compared to a current time. If the entry in the OUT tag read list is recent, then an incoming event is detected by act 530, and information about the event is sent to a server over a network and tag detection signals stored in an IN tag read list are updated to include the tag detection signal. The tag detection signal is also added to the IN tag read list when the entry in the OUT tag read list is determined to not be recent at act 525. Additionally, any tag detection signals identified to not be connected with a detected movement may be flagged as orphaned reads by act 545.

It should be appreciated that any suitable time interval may be used to determine "recent" signals, and this interval may be different for different processing modes. Moreover, the time interval may be configurable. The time interval may be included as part of configuration parameters 242 stored in sensor system 226. The time interval may be provided as a configuration parameter to a server, such as servers 210 and 310, and transferred to a sensor system by the server including the time interval in a message and transmitting the message to the sensor system. The time interval may be used to determine whether a previous tag detection signal was recent when processing a current tag detection signal. Time information associated with the previous tag detection signal may be stored in tag signal data set 224 and may be compared to time information associated with a subsequent tag detection signal, such as by determining an amount of time between the subsequent tag detection signal and the stored tag detection signal. When the amount of time between the two tag detection signals is less than the time interval, then the stored tag detection signal may be identified as "recent." In some embodiments, tag identification information for the stored tag detection signal may be the same as tag identification information for the subsequent tag detection signal, indicating that both tag detection signals correspond to the same tag. As a specific example, for some modes, a tag detection signal at the IN antenna that occurs within 15 seconds of a tag detection signal from an OUT antenna may be regarded as recent. In other modes, in which, for example a person or object with a tag may be expected to stay in a location for hours, a tag detection signal may be regarded as "recent" when the time between signals is less than an hour or some predetermined number of hours.

Similar processing tasks compare the tag detection signal to IN tag read lists when the antenna is identified as an OUT antenna by act 515. Acts 550, 555, 560, and 565 mirror acts 520, 525, 530, and 540, respectively, and include processing steps to detect outgoing events to send to a server over a network.

Figure 6:
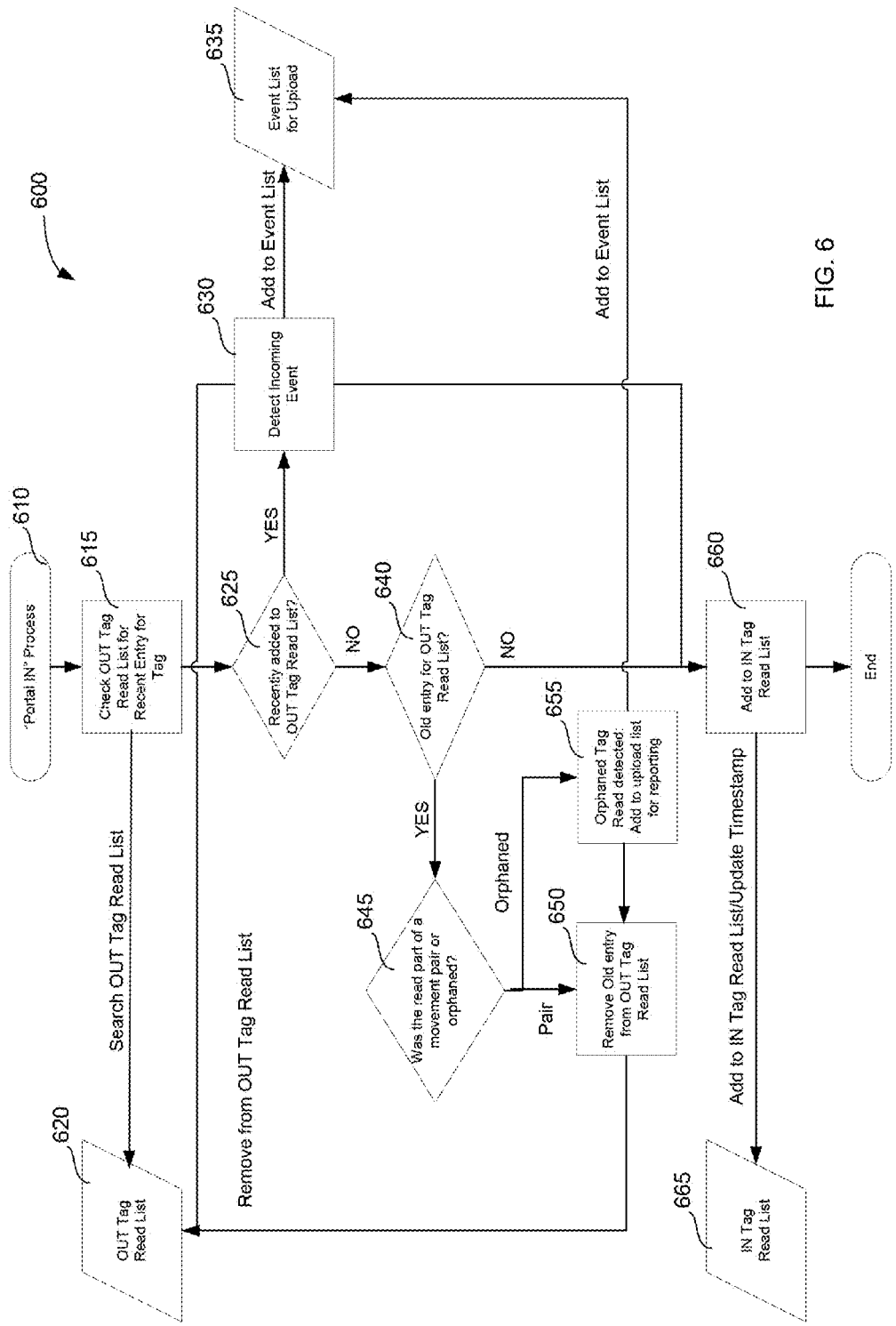
FIG. 6 is a flowchart illustrating an exemplary method for processing tag detection signals received from antennas configured to operate in Portal IN mode.

FIG. 6 illustrates an exemplary embodiment for processing tag detection signals by Portal IN process 440. Method 600 may be performed, for example, by one or more components of sensor system 226 such as signal analyzer 228 and/or event identifier 230, although other implementations are possible and method 600 is not limited in this respect. Stored tag detection signals stored in tag signal data set(s) 224 may be stored in the form of one or more read lists. Portal IN process may identify events associated with a tag as incoming or entering a room based on comparing the tag detection signal to stored tag detection signals associated with an OUT antenna. Processing of a tag detection signal transmitted by an antenna configured in Portal IN mode includes searching an OUT tag read list for a tag entry identifying the tag corresponding to the tag detection signal at act 615, detecting an incoming event when the tag entry has been added recently to the OUT tag read list at acts 625 and 630, and adding the incoming event to an event list for upload. When an incoming event is detected at act 630, the entry for the tag is removed from the OUT tag read list.

If the entry in the OUT tag read list is not identified as an old entry at act 640, then the tag detection signal is added to and IN tag read list at act 660. However, if the entry in the OUT tag read list is identified as old, then processing proceeds to act 645 to identify whether the tag associated with the entry corresponds to a movement or paired set of tag detection signals, or if the entry corresponds to an orphaned tag detection signal. If the entry corresponds to a movement pair by act 645, the entry is removed from the OUT tag read list by act 650. If the entry corresponds to an orphaned tag detection signal, then a corresponding orphaned tag read is added to a list of events for reporting by act 655, and the entry is removed from the OUT tag read list by act 650. Events identified by Portal IN process may be stored in one or more event data sets 234. Information related to these events may be included in a message constructed by message generator 236 and transmitted to a server.

It should be appreciated that any suitable time interval may be used to determine "old" signals, and this interval may be different for different processing modes. Moreover, the time interval may be configurable. As a specific example, for some modes, a tag detection signal at the IN antenna more than 5 minutes after of a tag detection signal from an OUT antenna may be regarded as old. In other modes, in which, for example a person or object with a tag may be expected to stay in a location for hours, a tag detection signal may be regarded as "old" when the time between signals is more than eight hours or some predetermined number of hours.

Figure 7:
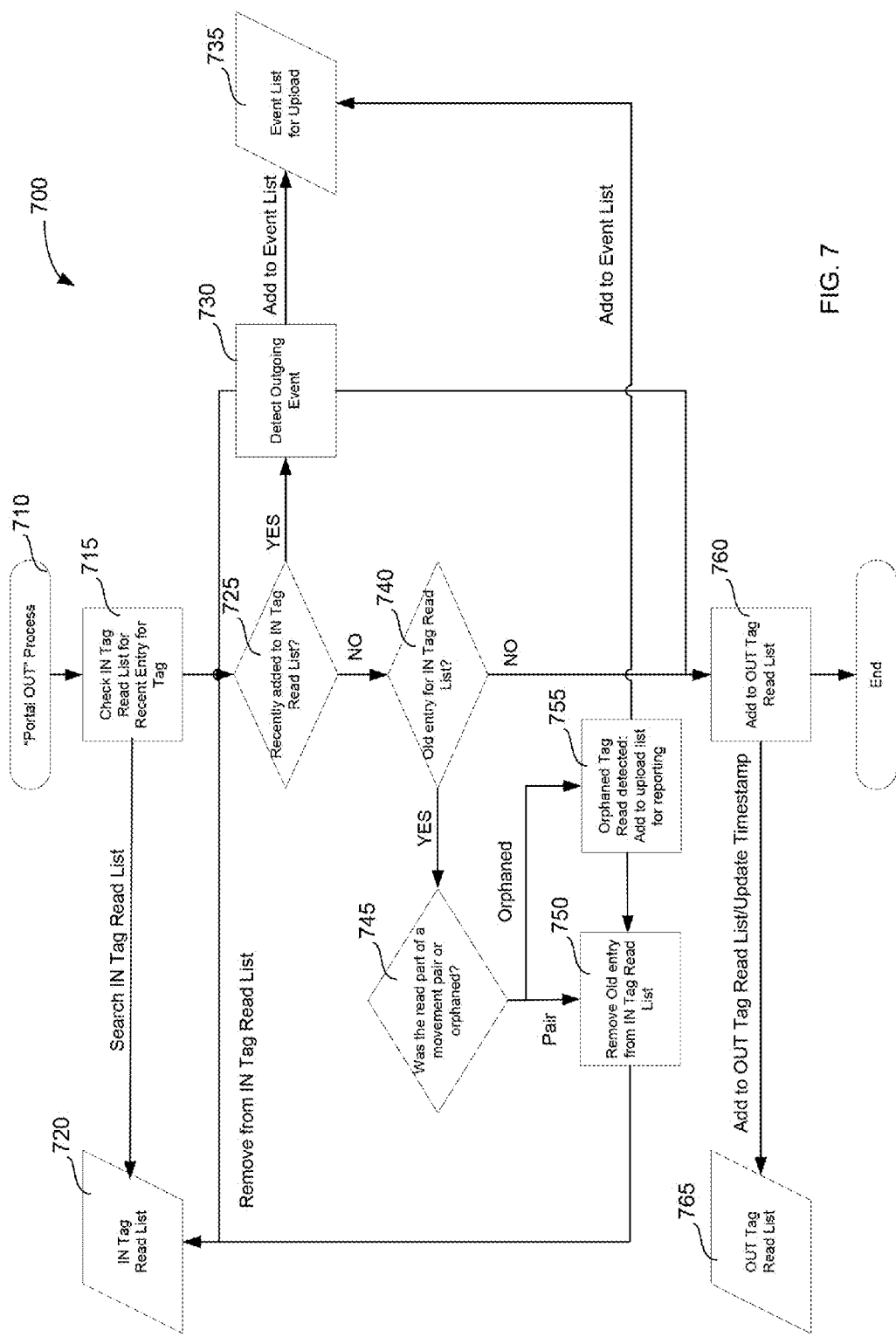
FIG. 7 is a flowchart illustrating an exemplary method for processing tag detection signals received from antennas configured to operate in Portal OUT mode.

In a similar manner, outgoing events may be detected by comparing the tag detection signal to stored tag detection signals from inside antennas in an IN tag read list. Exemplary processing tasks for a tag detection signal transmitted by an antenna configured to operate in Portal OUT mode is illustrated in FIG. 7. Method 700 may be performed, for example, by one or more components of sensor system 226 such as signal analyzer 228 and/or event identifier 230, although other implementations are possible and method 700 is not limited in this respect. Stored tag detection signals stored in tag signal data set(s) 224 may be stored in the form of one or more read lists. The portal OUT process may identify events associated with a tag as outgoing or leaving a room based on comparing the tag detection signal to stored tag detection signals associated with an IN antenna.

Processing of a tag detection signal transmitted by an antenna operating in Portal OUT mode includes searching an IN tag read list for a tag entry identifying the tag corresponding to the tag detection signal at act 715, detecting an outgoing event when the tag entry has been added recently to the IN tag read list of acts 725 and 730, and adding the outgoing event to an event list for upload. When an outgoing event is detected at act 730, the entry for the tag is removed from the IN tag read list.

If the entry in the IN tag read list is not identified as an old entry at act 740, then the tag detection signal is added to and OUT tag read list at act 760. However, if the entry in the IN tag read list is identified as old, then processing proceeds to act 745 to identify whether the tag associated with the entry corresponds to a movement or paired set of tag detection signals, or if the entry corresponds to an orphaned tag detection signal. If the entry corresponds to a movement pair by act 745, the entry is removed from the IN tag read list by act 750. If the entry corresponds to an orphaned tag detection signal, then a corresponding orphaned tag read is added to a list of events for reporting by act 755, and the entry is removed from the OUT tag read list by act 750. Events identified by Portal OUT process may be stored in one or more event data sets 234. Information related to these events may be included in a message constructed by message generator 236 and transmitted to a server.

Figure 8:
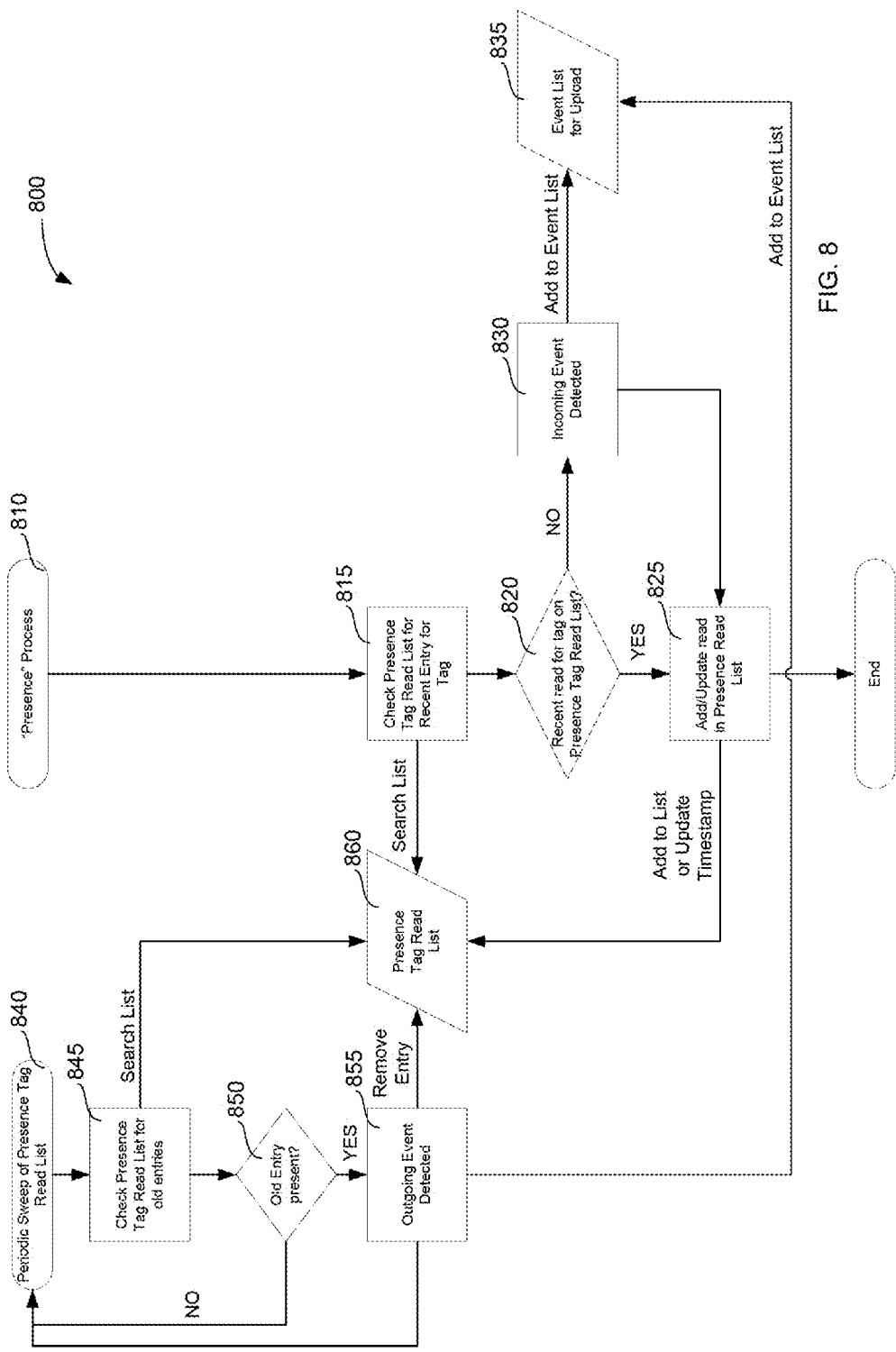
FIG. 8 is a flowchart illustrating an exemplary method for processing tag detection signals received from antennas configured to operate in Presence mode.

FIG. 8 illustrates an exemplary embodiment for processing tag detection signals by Presence process 460. Method 800 may be performed, for example, by one or more components of sensor system 226 such as signal analyzer 228 and/or event identifier 230, although other implementations are possible and method 800 is not limited in this respect. Stored tag detection signals stored in tag signal data set(s) 224 may be stored in the form of one or more tag read lists. Presence process may identify events associated with a tag's arrival and/or departure from a region proximate to an antenna based on comparing the tag detection signal to stored tag detection signals associated with the one or more antennas within the same sensor system. The stored tag detection signals may be stored in a Presence tag read list. Processing of a tag detection signal transmitted by an antenna configured in Presence mode includes searching a Presence tag read list for a tag entry identifying the tag corresponding to the tag detection signal at act 815, detecting an incoming event when the tag entry has been added recently to the Presence tag read list of acts 820 and 830, and adding the incoming event to an event list for upload. When an incoming event is detected at act 830, the entry for the tag may be added to the Presence tag read list at act 825.

As a background process, tag detection signals stored in Presence tag read list 860 are periodically searched to identify any old entries at act 845. The tag detection signals stored in Presence tag read list may be reviewed at periodic time intervals configured by a user. When old entries are present, an outgoing event is detected at act 855. The event may be provided to a list for upload, and the entry in the Presence tag read list may be removed. Events identified by Presence process may be stored in one or more event data sets 234. Information related to these events may be included in a message constructed by message generator 236 and transmitted to a server.

Figure 9:
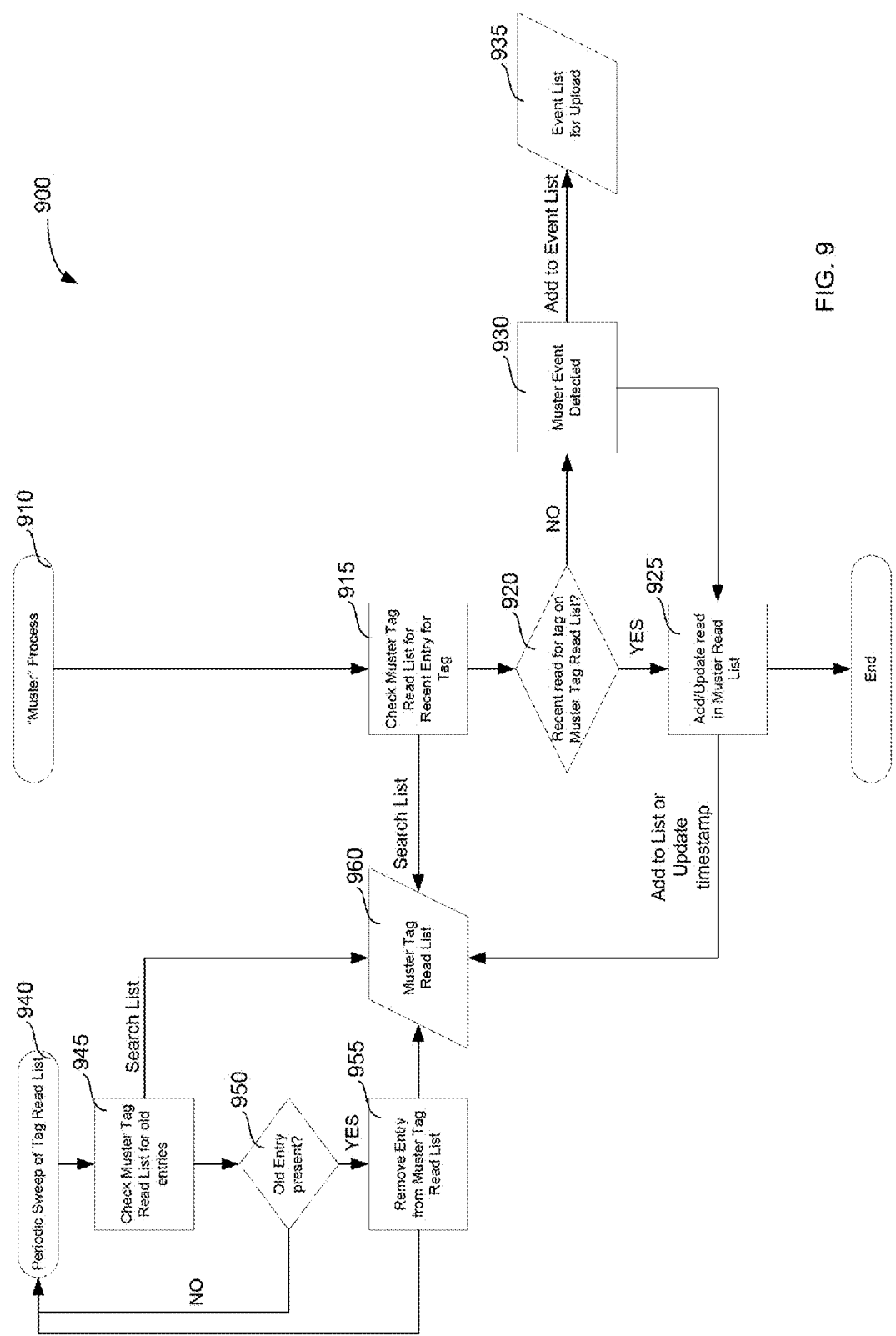
FIG. 9 is a flowchart illustrating an exemplary method for processing tag detection signals received from antennas configured to operate in Muster mode.

FIG. 9 illustrates an exemplary embodiment for processing tag detection signals received from antennas configured to operate in Muster mode. The processing tasks associated for tag detection signals transmitted by antennas operating in Muster mode include searching a Muster tag read list for a tag entry identifying the tag corresponding to the tag detection signal at act 915, detecting a muster event when the tag entry has been added recently to the Muster tag read list at acts 920 and 930, and adding the muster event to an event list for upload. When a muster event is detected at act 930, the entry for the tag is added to the Muster tag read list at act 925.

As a background process, tag detection signals stored in Muster tag read list 960 are searched to identify any old entries at act 945. The tag detection signals stored in the Muster tag read list may be reviewed at periodic time intervals configured by a user. When an old entry is present, the entry may be removed from the Muster tag read list. Events identified by Muster process may be stored in one or more event data sets 234. Information related to these events may be included in a message constructed by message generator 236 and transmitted to a server.

Figure 10:
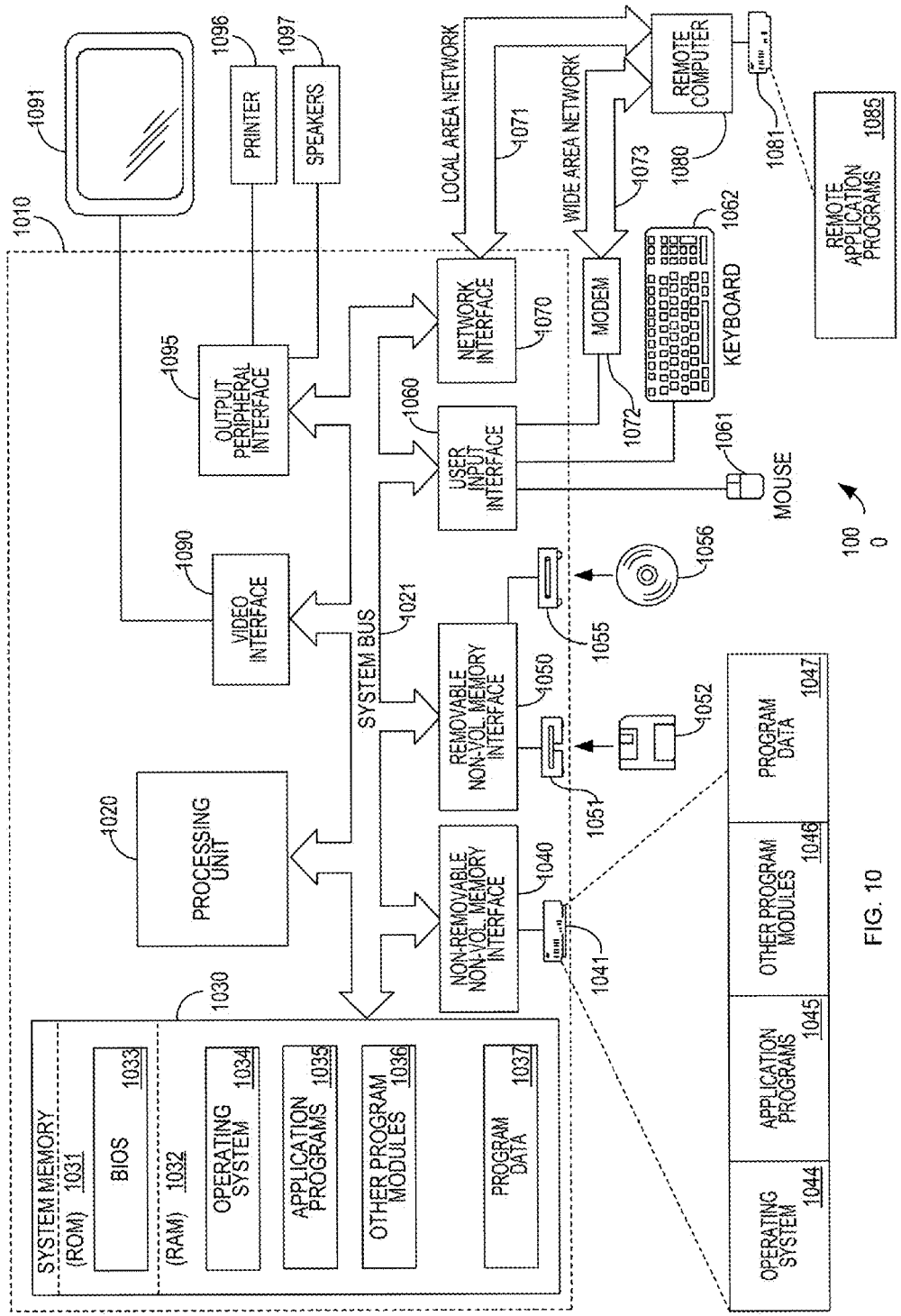
FIG. 10 is an example of a suitable computing system environment in which embodiments of the invention may be implemented.

FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

FIG. 10 is illustrative of the various processing capabilities that may be used to implement different aspects of the techniques of the present application. Some components may not implement all of the processing capabilities illustrated in FIG. 10 such as a sensor unit. However, other devices such as those used to access information on the server or to provide processing hardware to the sensor unit may be implement processing components illustrated in FIG. 10.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface, such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system comprising:
   a plurality of antennas deployed in a location, wherein each antenna of the plurality of antennas is configured to receive a signal indicative of a tag proximate to the antenna;
   a memory;
   a processor configured to:
      process tag detection signals that are based on the received signals, wherein the processing comprises:
         selectively storing tag detection signals in the memory; and
         identifying an event related to presence of a tag at the location based on a plurality of tag detection signals, the plurality of tag detection signals comprising at least one stored tag detection signal, wherein the event is representative of a combination of at least a portion of the plurality of tag detection signals, wherein the portion comprises tag detection signals associated with different antennas of the plurality of antennas; and
   a transmitter configured to transmit a message indicating the event over a wide area network to a server.

2. The system of claim 1, wherein identifying an event comprises identifying that a tag detection signal of the plurality of tag detection signals includes tag identification information that matches tag identification information of the at least one stored tag detection signal.

3. The system of claim 2, wherein the tag detection signal of the plurality of tag detection signals is based on signals received by a first antenna of the plurality of antennas and the at least one stored tag detection signal is based on signals received by a second antenna of the plurality of antennas.

4. The system of claim 1, wherein:
   the processor is further configured to store time information associated with the at least one stored tag detection signal, and
   identifying an event comprises comparing the time information associated with the at least one stored tag detection signal to time information associated with at least one other tag detection signal of the plurality of tag detection signals.

5. The system of claim 4, wherein an event is identified by comparing a difference between the time information associated with the at least one other tag detection signal and the time information associated with the at least one stored tag detection signal to a time interval.

6. The system of claim 4, wherein an event is identified when a difference between the time information associated with the tag detection signal of the plurality of tag detection signals and the time information associated with the at least one stored tag detection signal is greater than a time interval, and the tag detection signal of the plurality of tag detection signals includes tag identification information that is distinct from the tag identification information of the at least one stored tag detection signal.

7. The system of claim 4, wherein an event is identified by an absence of at least one tag detection signal corresponding to the tag for an amount of time exceeding a time interval.

8. The system of claim 1, wherein the at least one stored tag detection signal is modified to reflect the identified event.

9. The system of claim 1, wherein the at least one stored tag detection signal is deleted from the memory when a difference between time information associated with the at least one stored tag detection signal and a current time is greater than a predetermined time interval.

10. The system of claim 1, wherein the transmitter is configured to transmit the message via at least one data buffer, and the at least one data buffer is configured to store at least a portion of the message when the transmitter is unable to transmit the message.

11. The system of claim 1, wherein the transmitter is configured to transmit at least a portion of the message over the wide area network when the system is in communication with the server and the at least one data buffer is configured to store at least a portion of the message when transmission of the message is interrupted.

12. A system comprising:
a wide area network receiver configured to receive, from a sensor unit having a plurality of antennas, a message reporting at least one event identified by the sensor unit processing signals received from a tag proximate to an antenna of the plurality of antennas and at least one feature of the signals including signal strength;
a processor configured to:
process the message, wherein the processing comprises:
analyzing the at least one event and signal strength of the signals to evaluate adjustment of a power setting used to operate the at least one antenna of the plurality of antennas; and
updating the power setting when analysis of the at least one event and the signal strength indicates adjusting the power setting; and
a wide area network transmitter configured to transmit the updated power setting to the sensor unit.

13. The system of claim 12, wherein processing the message further comprises analyzing the at least one event to identify a portion of the at least one event that consolidates a number of occurrences for an event type.

14. The system of claim 12, wherein processing the message further comprises analyzing the at least one event and the at least one feature to identify information indicative of a status of the sensor unit, and the processor is further configured to present a status message indicating the status to a user.

15. The system of claim 12, wherein the updated power setting is used to operate the at least one antenna in response to the sensor unit receiving the updated power setting.

16. The system of claim 12, wherein processing the message further comprises presenting information related to the message to a user, wherein the information presented to the user indicates a status of the sensor unit.

17. At least one non-transitory computer-readable medium storing computer-executable instructions that, when executed, perform a method comprising:
receiving, from a plurality of antennas deployed in a location and configured to detect different event types, signals indicating a tag proximate to an antenna of the plurality of antennas;
processing, by a reader unit in communication with the plurality of antennas, tag detection signals that are based on the received signals, wherein the processing comprises:
selectively storing tag detection signals; and
identifying events related to presence of a tag at the location based on a plurality of tag detection signals and information identifying an event type associated with at least one antenna of the plurality of antennas corresponding to the plurality of tag detection signals, the plurality of tag detection signals comprising at least one stored tag detection signal, and wherein the events include a plurality of event types and each of the events represent a combination of multiple tag detection signals of the plurality of tag detection signals; and
transmitting a message indicating the events from the reader unit over a wide area network to a server.

18. The at least one non-transitory computer-readable medium of claim 17, wherein the received signals indicate at least one configuration parameter of the antenna, and identifying events is based on the at least one configuration parameter.

19. The at least one non-transitory computer-readable medium of claim 17, wherein the plurality of event types includes an event type corresponding to arrival of the tag to a region proximate to an antenna of the plurality of antennas at the location.

20. The at least one non-transitory computer-readable medium of claim 17, wherein the plurality of event types includes an event type corresponding to departure of the tag from a region proximate to an antenna of the plurality of antennas at the location.

21. The at least one non-transitory computer-readable medium of claim 17, wherein the plurality of event types includes an event type corresponding to movement of a user associated with the tag from a first region proximate to a first antenna at the location to a second region proximate to a second antenna at the location.

* * * * *